United States Patent
Adams (10) Patent No.: US 8,650,652 B2
(45) Date of Patent: Feb. 11, 2014

(54) RENDERING SUBJECT IDENTIFICATION ON PROTECTED MESSAGES LACKING SUCH IDENTIFICATION

(75) Inventor: Neil Adams, Waterloo (CA)

(73) Assignee: Blackberry Limited, Waterloo (CA)

( * ) Notice: Subject to any disclaimer, the term of this patent is extended or adjusted under 35 U.S.C. 154(b) by 1668 days.

(21) Appl. No.: 11/535,085

(22) Filed: Sep. 26, 2006

(65) Prior Publication Data

US 2007/0072564 A1 Mar. 29, 2007

Related U.S. Application Data

(60) Provisional application No. 60/720,053, filed on Sep. 26, 2005.

(51) Int. Cl.
*G06F 21/00* (2013.01)

(52) U.S. Cl.
USPC .............................................. 726/26; 726/28

(58) Field of Classification Search
USPC ............................. 726/1–21, 26–28; 715/152
See application file for complete search history.

(56) References Cited

U.S. PATENT DOCUMENTS

| | | | |
|---|---|---|---|
| 6,684,088 B1 | 1/2004 | Halahmi | |
| 7,395,310 B1* | 7/2008 | Sikora et al. | 709/201 |
| 2002/0120692 A1 | 8/2002 | Schiavone | |
| 2003/0023695 A1* | 1/2003 | Kobata et al. | 709/206 |
| 2003/0037261 A1* | 2/2003 | Meffert et al. | 713/201 |
| 2003/0217261 A1* | 11/2003 | Yokota et al. | 713/153 |
| 2004/0168055 A1 | 8/2004 | Lord et al. | |
| 2004/0205248 A1 | 10/2004 | Little et al. | |
| 2007/0050456 A1* | 3/2007 | Vuong et al. | 709/206 |
| 2007/0179932 A1* | 8/2007 | Piaton | 707/3 |

FOREIGN PATENT DOCUMENTS

| | | |
|---|---|---|
| EP | 1288812 | 3/2003 |
| JP | 1998313280 | * 11/1998 |
| JP | 2004288111 | * 10/2004 |
| WO | WO2005109265 | * 5/2005 |

OTHER PUBLICATIONS

"BlackBerry Security"—White Paper, Release 4.0; Research in Motion Limited; 2005.
"BlackBerry with the S/ MIME Support Package"—White Paper, Version 4.0; Research in Motion Limited; 2004.
"Request for Comments: 3851"; B. Ramsdell—Editor; Sendmail, Inc., Jul. 2004.
Supplemental European Search Report dated Nov. 25, 2008.
Office Action dated Apr. 28, 2011 for corresponding Canadian Patent Application No. 2,623,260.

* cited by examiner

*Primary Examiner* — Edward Zee
*Assistant Examiner* — Chi Nguy
(74) *Attorney, Agent, or Firm* — Ridout & Maybee LLP (57) ABSTRACT

Rendering subject information for a protected message received and stored at an electronic communications device, wherein the message is initially received by the electronic communications device without subject information. Selected information is extracted from the protected message and stored on the electronic communications device as subject information for the protected message.

19 Claims, 5 Drawing Sheets

RENDERING SUBJECT IDENTIFICATION ON PROTECTED MESSAGES LACKING SUCH IDENTIFICATION

RELATED APPLICATIONS

This application claims priority to U.S. Provisional patent application No. 60/720,053 filed Sep. 26, 2005.

FIELD

Messaging clients that send and receive electronic messages.

BACKGROUND

A number of messages, received through a messaging application or client, could each have a portion that includes a number of text characters intended to identify the subject of the message. When the message is an e-mail message, this subject identification portion is usually referred to as the subject line of the e-mail message.

When the user of a messaging application makes a request to display the messages stored in a certain location in a list, often the subject identification portions of a number of messages in the specified location will be displayed within the user interface provided by the messaging application. In such a situation, the user reading the listed subject identification portions may be able to faster identify a message of interest as compared to when the user is not able to view such identifying portions.

Subject identification portions have at least several other impacts on the sending and receiving of messages. For example, viewing of subject identification portions might help a messaging application user to recognize that a particular message belongs to a message thread of interest. If a messaging application is not able to render a meaningful subject identification for display within the user interface, then it might take more time for the user to recognize that the particular message belongs to the message thread of interest.

Accordingly, it would be advantageous to improve methods and systems for rendering subject identification on messages.

BRIEF DESCRIPTION OF THE DRAWINGS

Reference will now be made, by way of example, to the accompanying drawings.

Similar reference numerals have been used in different figures to denote similar components.

DESCRIPTION OF EXAMPLE EMBODIMENTS

According to one example embodiment is a method for rendering subject information for a protected message received and stored at an electronic communications device, wherein the protected message has been protected at an originating sender's device and is initially received by the electronic communications device without subject information. The method comprises: extracting selected information from the protected message and storing the selected information on the electronic communications device as subject information for the protected message.

According to another example embodiment is a computer program product including a computer readable medium carrying code for executing the subject rendering method. According to another example embodiment is an electronic communications device enabled to receive electronic messages, the device includes a display, a communications subsystem for receiving messages from an external source, storage for storing messages received through the communications subsystem, a user input device, and a messaging client for processing messages received by the device through the communications subsystem. The messaging client comprises a subject rendering module for extracting information from protected messages that are received at the device without subject information and storing the extracted information on the storage for use in the subject display field.

The present description of example embodiments of the invention does not limit implementation to any particular computer programming language or system architecture. Embodiments of the present invention are not limited to any particular operating system, mobile device architecture, or computer programming language. Moreover, although some of the embodiments described below include electronic mobile communications devices, at least some embodiments of the present invention are not limited to mobile devices; rather, a variety of electronic communications-enabled devices or terminals are contemplated, including handheld devices, mobile telephones, personal digital assistants (PDAs), personal computers, audio-visual terminals, interactive television terminals, and other messaging enabled devices. One skilled in the art will appreciate that messaging applications can be installed on most of these user devices and terminals.

Figure 1:
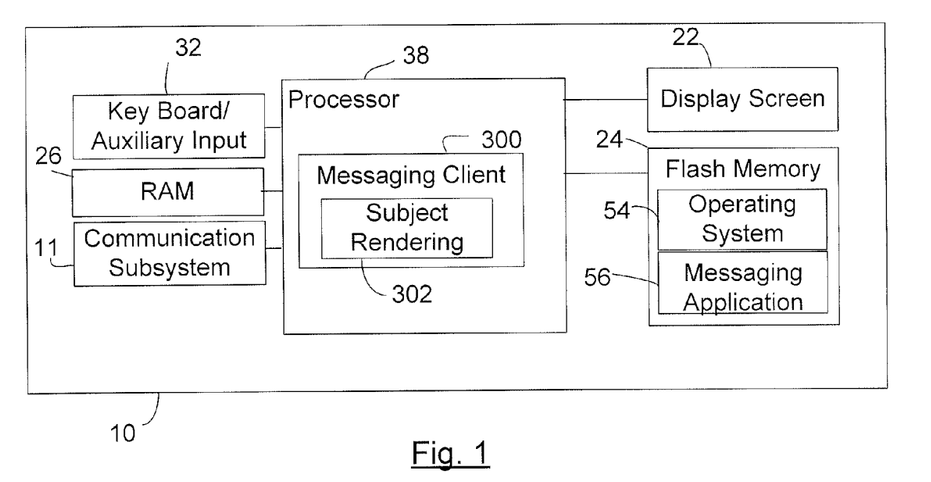
FIG. 1 shows a block diagram of an example of a mobile device to which embodiments of the present invention can be applied.

Referring now to the drawings, FIG. 1 is a block diagram of an electronic mobile communications device 10 to which example embodiments of the invention can be applied. In at least one example, the mobile device 10 is a two-way device having data and possibly also voice communication capabilities. In an example embodiment, the device 10 has the capability to exchange messages with other devices and computer systems on the Internet. Depending on the functionality provided by the device 10, in various embodiments the device may be a data communication device, a multiple-mode communication device configured for both data and voice communication, a mobile telephone, a PDA enabled for wireless communication, or a computer system enabled to send and receive messages over a network, among other things.

In the illustrated embodiment, the device 10 includes a wireless communications subsystem 11 for exchanging electronic messages with one or more communications networks, including for example cellular type wide area wireless networks and/or wireless local area networks. The device 10 includes a microprocessor 38 that controls the overall operation of the device. The microprocessor 38 interacts with the communications subsystem 11 and also interacts with further device subsystems such as a display 22, flash memory 24, random access memory (RAM) 26, and user input devices 32 such as a keyboard or keypad and auxiliary on-screen navigation and selection input devices such as a touch screen, touch pad or thumbwheel. In some embodiments, more than one microprocessor may be used to control the device 10. In some embodiments, the device 10 can include communications subsystems for communication with a network or device over a fixed link, for example over a USB link or a Ethernet link.

Operating system software 58 and various software applications used by the microprocessor 38 are, in one example embodiment, stored in a persistent store such as flash memory 24 or similar storage element. Those skilled in the art will appreciate that the operating system 54, other software applications, or parts thereof, may be temporarily loaded into a volatile store such as RAM 26.

The microprocessor 38, in addition to its operating system functions, can enable execution of software applications on the device. A predetermined set of software applications which control basic device operations, including data and voice communication applications for example, will normally be installed on the device 10. In one embodiment, the software resident on the device 10 includes a messaging application 56. Under instructions from the messaging application 56 resident on the device 10, the processor 38 is configured to implement a messaging client 300 for interacting with the various device subsystems described above for permitting a user to take actions in relation to electronic messages, and more specifically the user can compose, send, receive and display e-mail and/or text messages or other items, such as tasks, calendar items, etc. In some embodiments, some or part of the functionality of the messaging client 300 can be implemented through firmware or hardware components instead of, or in combination with, computer software instructions executed by the microprocessor 38 (or other processors).

It is noted that embodiments described in the present application are not limited to use in association with e-mail messages and may apply to other appropriate messages, including for example messages that have text in the message body or in attachments to the message, including for example text messages such as SMS messages, and messages pertaining to calendar entries, such as electronic meeting invitations for example.

Figure 2:
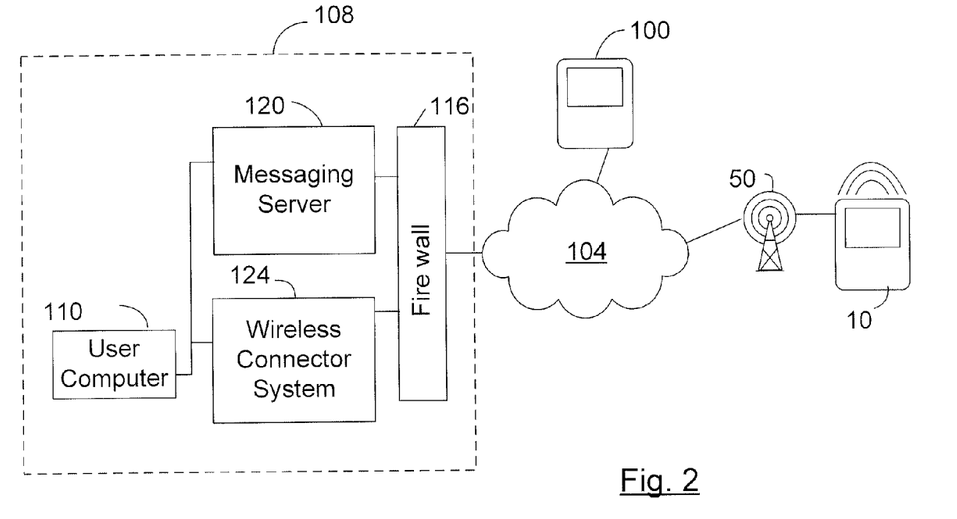
FIG. 2 shows a block diagram of an example architecture in which messages can be communicated to and from devices such as the mobile device of FIG. 1.

FIG. 2 shows a block diagram of an example architecture within which the mobile device 10 can receive and send electronic messages. Although only one device 10 is shown in FIG. 2, typically several such devices will be present. In the illustrated embodiment, the mobile device 10 is connected to receive messages through at least one wireless mobile network 50, which in an example embodiment is a network that supports wireless packet data (by way of non-limiting example, in various embodiments, network 50 may support at least one of Mobitex™, DataTAC™, GSM (Global System for Mobile Communication), GPRS (General Packet Radio System), EDGE (Enhanced Data rates for GSM Evolution) and/or UMTS (Universal Mobile Telecommunications Systems, WiFi and/or WiMax). In some embodiments, the mobile device 10 may be enabled to exchange electronic messages over at least two different wireless networks, for example a cellular type GSM network and a WLAN (Wireless Local Area Network). As shown in FIG. 2, the wireless network 50 is connected through a wide area network such as the Internet 104 to an enterprise network 108. In some embodiments, the wireless network 50 may have a connection to the enterprise network 108 that does not pass through the Internet 104.

Enterprise network 108 is in an example embodiment a network operated by or for a corporation or organization, for example an intranet including one or more local area networks that are located behind a firewall 116. A number of users are associated with the enterprise network 108 and have unique email addresses assigned to them. At least some of those users have an email enabled user computer 110 such as a desktop computer connected to the enterprise network 108. At least one messaging server 112, which may for example employ Microsoft Exchange™ (or other suitable email server software), is connected to the firewall 116 for receiving email messages from the Internet 104 and routing those messages to the appropriate user computer 110. A number of the users of the enterprise network also have a mobile device 10 that is associated with the user's unique email address such that incoming email addressed to the user is sent to the user's mobile device 10 as well as to the person's user computer 110.

In the illustrated embodiment the enterprise network 108 includes a wireless connector system 124 for forwarding received electronic messages out to the user's mobile device 10. The wireless connector system 124, which is located behind firewall 116, functions as the interface between the enterprise network 108 and the wireless network 50.

A number of messaging enabled devices 100 (e.g. desktop computers, notebook computers, other mobile devices etc.) are connected to the Internet 104 and can also send and receive messages. Some messaging enabled devices 100 may be part of the enterprise network 108.

In the architecture of FIG. 2, an email message sent from a messaging enabled device 100 connected to the Internet 104 to a user of a user computer 110 and a mobile device 10 will be routed as follows. The email message will be sent from the messaging enabled device 100 through the Internet 104 to the firewall 116 of the enterprise network 108. The messaging server 112 receives the email from the firewall 116 and routes it within the enterprise network 108 as appropriate. In the situation where the received message is addressed to a user of a mobile device 10, the messaging server 120 is preconfigured to provide a copy of the email message to the wireless connector system 124, which subsequently transmits the email message through the firewall 116 and Internet 104 to the wireless network 50 for transmission to the mobile device 10. In example embodiments, the wireless connector system 124 encrypts email messages that are sent out to the handheld device 10 so as to ensure that the email messages are protected outside of the enterprise firewall 116. By way of example, the wireless connector system 124 may encrypt email messages using Advanced Encryption Standard (AES) or Triple Data Encryption Standard (Triple DES) encryption methods using a key unique to the target mobile device 10 to encrypt data in transit. The email message is then decrypted after it is received at the mobile device 10. As known in the art, such encryption requires the pre-establishment of keys at the enterprise network 108 and at the mobile device 10.

In addition to the encryption of a message along part of its transmission path (for example, the path between the wireless connector system 124 and the mobile device 10 as discussed above), a further layer of security can be implemented by encrypting or otherwise protecting the email message from an earlier point in its transmission path, for example at the originating email enabled device 100, and then decrypting it at the mobile device 10. Such email messages will be twice encrypted for at least part of the transmission path—for example, the email message will first be encrypted at the originating email enabled device 100, and then the encrypted message will be encrypted again by the wireless connector system 124 for transmission to the mobile device 10. Thus, for such twice-encrypted messages, sender-to-recipient encryption is used in combination with further encryption applied at the wireless connector system 124.

In an example embodiment, Secure Multipurpose Internet Mail Extensions (S/MIME) technology is used to enable sender-to-recipient authentication and confidentiality to help maintain data integrity and privacy from the time that the originator of the message sends it over the wireless network until the message is decoded and read by the message recipient. As known in the art, S/MIME relies on public key cryptography (private and public keys) to provide confidentiality, authenticity, and integrity. Messages can be protected by being (a) encrypted; (b) signed; or (c) encrypted and signed, Encrypting messages with S/MIME provides confidentiality, and signing messages with S/MIME provides authenticity and integrity (by for example, allowing the sender identity to be authenticated). Signing and encryption can be combined to provide confidentiality, authenticity, and integrity. Private and public keys S/MIME uses public key cryptography to secure messages. The public key, which can be shared, is typically distributed in a certificate that validates the authenticity of the public key. The sender uses the recipient's public key at the originating device 100 to encrypt a message, which can then be decrypted using only the recipient's private key at the receiving mobile device 10. The sender's private key is used to sign messages. Recipients can verify the signature if they have the sender's public key. Private key information is never made public.

One skilled in the art will appreciate that similar alternatives to S/MIME exist and can be used for sender-to-recipient encryption, such as Pretty Good Privacy MIME (PGP/MIME).

Keys for encrypting and decrypting messages within the illustrated networks can be stored in a variety of locations depending at least in part on where the message is encrypted and decrypted. For example, keys may be stored on a number of the messaging enabled devices 100 and a number of the devices 10. Keys may also be stored on smart cards (not shown) that communicate with the devices 100 or devices 10 via associated smart card readers (not shown). In addition, keys can be stored on one or more of the storage media (storage media of physical network servers in one example embodiment) behind corporate (or other organization) firewalls such as firewall 116, for example on wireless connector system 124.

The processing of received messages at the mobile device 10 will now be discussed in greater detail. As known in the art, a received email message commonly includes (a) a message header that includes (i) identification of the sender; (ii) list of recipients of the email; (iii) time and date that the email was sent; and (iv) a subject field; (b) a message body; and, in some cases (c) attachments. In many cases, the sender of an email message may leave the subject field of an email message blank. Embodiments described herein relate to the processing of received email messages that are protected and in which the sender of the email has left the subject field blank. As indicated above, using a protocol such as S/MIME, an email message can be protected at the originating sender's communications device by encrypting the email message, signing the email message, or encrypting and signing the email message.

As will be appreciated from the above description, in the presently described example embodiment, email messages arriving at the mobile device 10 over wireless communications network 50 can be subjected to at least two different levels of encryption protection, each requiring a separate key be used at the mobile device 10 for decryption. At a lower level of protection, the email is subjected to a single level of encryption applied at the wireless connector system 124. At the higher level of protection, the email is encrypted at the device of the originating sender (using S/MIME technology for example) and then encrypted a second time at the wireless connector system 124. Thus, at the lower level of protection, a received message has to be decrypted once by the mobile device 10 using a first predetermined key and at the higher level of protection, a received messages has to be decrypted twice at the mobile device 10 before it can be viewed, using the first key to remove the encryption applied at the wireless connector system 124 and a second predetermined key the remove the encryption applied at the device 100 of the originating sender (or at some other device in the distribution chain). In some embodiments, encryption at the wireless connecter system 124 may not be carried out, and the email may just be encrypted back at the device of the originating sender, or not at all. In some example embodiments, instead of being protected by encryption, a message can be protected at the originating sender's device by signature alone, or, in a further embodiment, a message can be protected at the originating sender's device by being both signed and encrypted.

When an email message is first received by the mobile device 10 through its communication subsystem 11, it is saved to device storage, for example to flash memory 24, for future display by the messaging client 300. In at least one embodiment, decryption of the message using the suitable key to reverse the encryption applied at the wireless connector system 124 is automatically applied as soon as the email message is received at the wireless device, such that (i) in the case of messages that were only encrypted at the wireless connector system 124 (i.e. those messages having the lower level of protection), such messages will be stored in an unencrypted state; and (ii) in the case of messages that were encrypted at the device of the originating sender and then again at the wireless connector system 124 (i.e. those messages having the higher level of protection), such messages will be stored with a single level of encryption, namely the encryption that was applied back at the device of the originating sender. Typically, the mobile device 10 will be configured to require entry of a user password to unlock the device, and accordingly, even the unencrypted stored messages have at least some protection from unauthorized access, although messages stored in an un-encrypted state can be viewed without authorization if someone manages to access the memory of the device 10. The sender-encrypted messages require entry of an additional password before they can actually be viewed. This additional password may be the same as the user password required to unlock the device. The additional password provides access to a secure key store in which the keys required for encryption operations are stored, including the user's private key or keys that are used to decrypt messages sent to the user.

In at least some embodiments, content protection may be enabled on the mobile device 10 such that locally stored messages are stored in an encrypted state by the mobile device, with sender-encrypted messages being twice encrypted. In such content protection enabled devices all received messages are encrypted locally at the device before they are stored and once the user unlocks the device with the correct password, the user can access messages, other than sender-encrypted messages, without requiring entry of an additional password. Thus, in at least one embodiment, the user input required with content protection enabled is not substantially any different than when content protection is not enabled. In at least one example embodiment, the keys used for encryption and decryption when content protection is enabled are both locally stored on the device 10 in a secure location. In another example embodiment, the keys used for encryption and decryption when content protection is enabled are both stored on a smart card mounted to a smart card reader associated with the device 10. Thus, one example embodiment, where content protection is enabled on mobile device 10, when a message is received at the device 10, the encryption applied at the wireless connector system 124 is removed using a first predetermined key, however, the message is then re-encrypted and stored at the device 10 using a key local to the mobile device 10, and then whenever the message is accessed, a further key is used to decrypt it.

Figure 3:
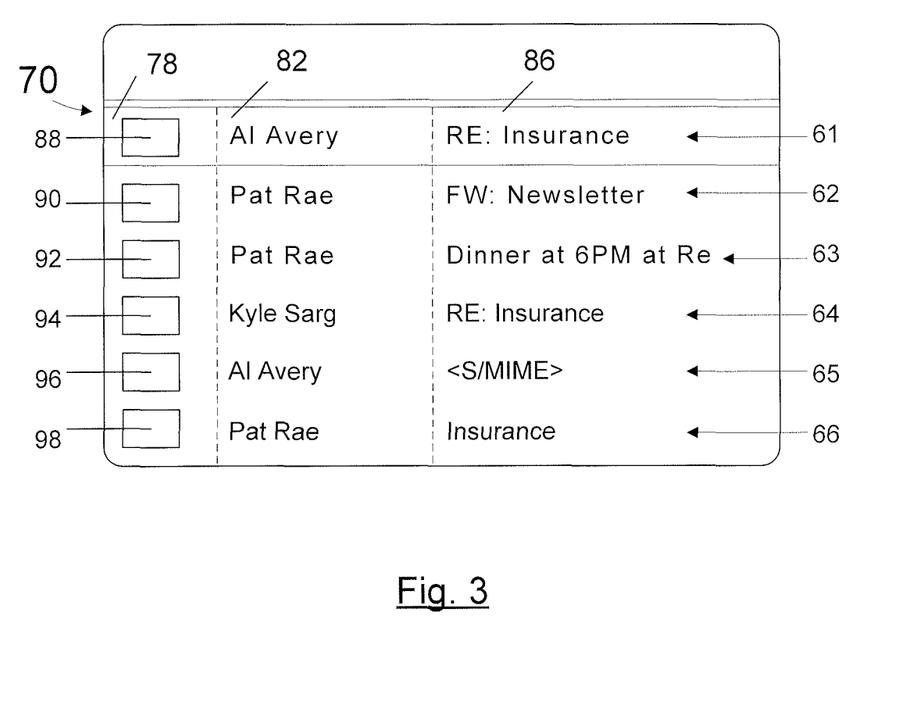
FIG. 3 shows, in diagrammatic form, a message list user interface generated on a display screen.

Referring to FIG. 3, a message list user interface 70 generated on a display 22 of the mobile device 10 by the messaging client 300 is illustrated. The user interface 70 corresponds to what the display of a mobile device might look like after the user has requested that the messaging client 300 display received messages in a list. This is typically done by clicking on an icon or a menu/list choice associated with a request to open the messaging client or to display inbox folder contents.

In the user interface 70, information entries about a plurality of messages 61, 62, 63, 64, 65, 66 are listed vertically. Going from left to right in the user interface 70, for each listed email message, there is a message icon field 78, a sender identifier field 82 and a message subject field 86. The fields are generally arranged in columns. Time sent information will typically also be shown for each message entry in the list, although such information is not illustrated in the Figure. Icons 88, 90, 92, 94, 96, 98 in the associated icon fields 78 can provide information about the e-mails with which they are associated. For example, an icon associated with an e-mail that has already been read can provide this information to the user by means of an appropriate graphical image displayed to the user (e.g. an envelope with its flap opened). Similarly an appropriate graphical image could be used for an e-mail that has not been read (e.g. an envelope with its flap closed). Other examples of information that the user might obtain by looking at these icons include information regarding signatures, encryption (e.g. a padlock) and messages associated with replies. The fields 82 and 86 also provide information about the listed messages. In the sender field 82, the name of the person who sent the message is listed. In the subject field 86, the subject identification portion (subject lines in this example) of the associated messages 61-66 is shown. It will be understood that the display of the mobile device could show additional/fewer and/or different columns than those shown in FIG. 3.

With respect to the message subject field 86, it will be seen that the e-mails 61, 64 and 66 have similar message subject lines. In particular, the text of the subject line of each of these messages is the same except for a "RE:" portion found in the message subject lines for the e-mails 61 and 64. The similar subject lines may be indicative of messages that belong to a common thread. The messaging client 300 may include search functionality in relation to the message subject lines of the e-mails so that a keyword search in relation to the message subject lines may be possible.

In some cases, the email messages arriving at the device 10 will not include any information in the subject line or field. In some cases, the person composing the message may have left the subject blank either intentionally or by accident. In some cases, the subject line may be stripped off the message somewhere during its transmission to the receiving mobile device 10.

Figure 4:
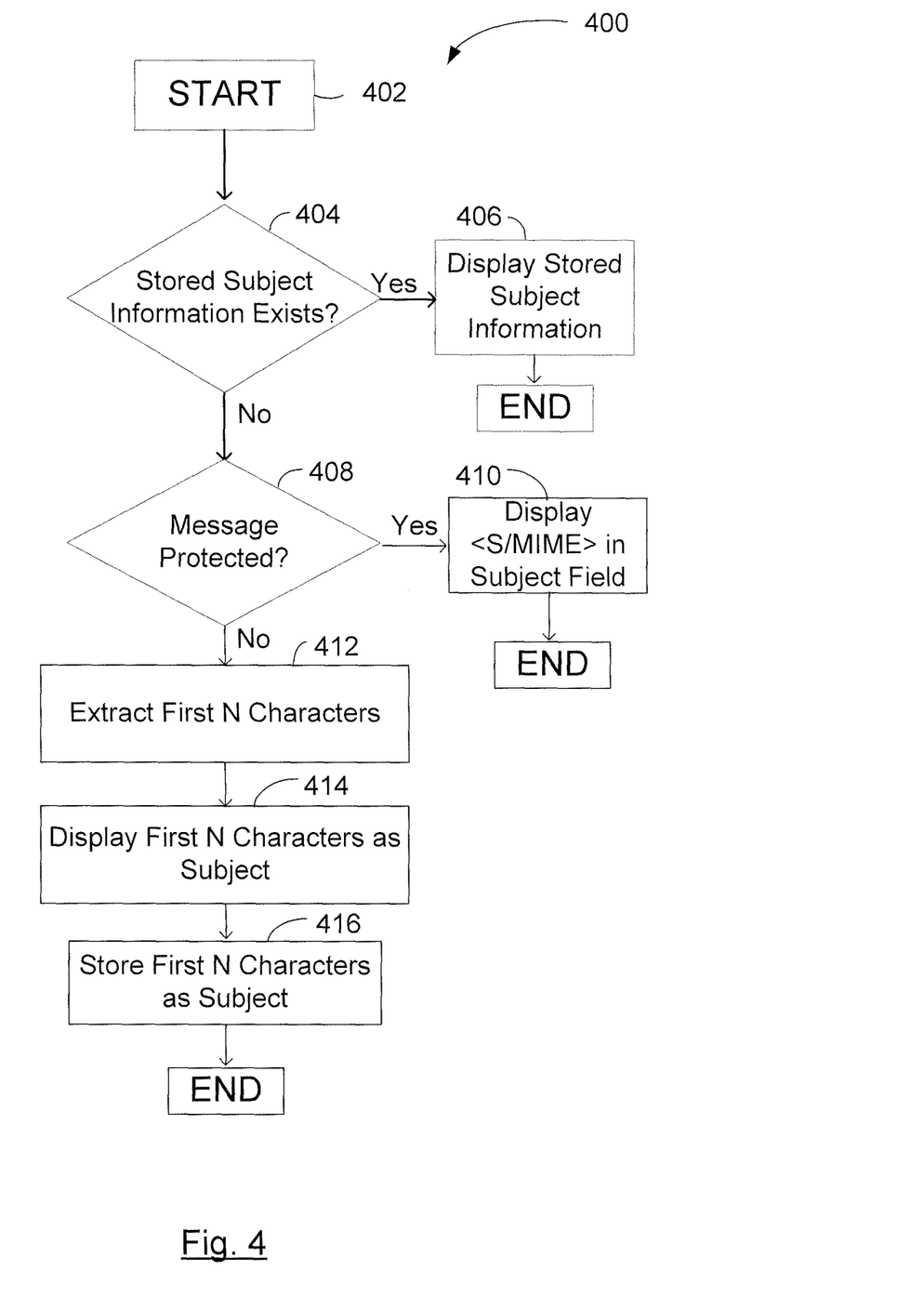
FIG. 4 shows in flow chart form, a subject identification rendering method in accordance with an example embodiment.

In the event that the subject line is missing from a received email, the messaging client 300 in an example embodiment is configured to render a subject in the subject field 86 of the messages list of user interface 70, and in this regard, FIG. 4 illustrates a flow chart representation of a process 400 for rendering a subject for an otherwise subject-less email message. The process 400 can be implemented by a subject rendering module 302 that in an example embodiment is part of messaging client 300. All or parts of the functionality of subject rendering module 302 may alternatively be implemented as part of another software application or as a stand-alone application that is called on by messaging client 300.

In an example embodiment the process 400 starts (box 402) when the messaging client 300 comes across a received message that has a blank subject field when generating the message list user interface 70 of FIG. 3. When the messaging client 300 encounters a message for which the subject field is blank, a check is performed (step 404) to determine if subject information for the message has previously been stored at the mobile device 10, and if so, that stored subject information is used in the subject field 86, and the process 400 ends. In the event that subject information for the message has not been stored previously at the mobile device 10, a determination is made if the message is protected, for example using encryption such that entry of a password is required to decrypt and view the message (for example, a sender-encrypted S/MIME message as discussed above requires entry of a password to retrieve the keys needed to decrypt and view the message). If the message is password protected and encrypted (for example using S/MIME), then information from the message to use in the subject line is not accessible, and as indicated in step 410, the phrase "<S/MIME>" (or some other predetermined phrase that is indicative of the fact that the message is encrypted) is displayed in the subject field 86. An example of this can be seen in FIG. 3 in which the message 65 is a sender-encrypted message that was received without subject information. The message 65 is displayed in the list of messages in user interface 70 with the phrase "<S/MIME>" appearing in it corresponding subject field 86. Further treatment of password-protected encrypted messages will be discussed further below.

Returning again to step 408, in the event that a determination is made that the message is not encrypted so as to require entry of a password to access it, then as indicated in block 412 the subject rendering module 302 can access the content of the email to extract information to use as subject information. As illustrated in block 412, in at least one embodiment, a block of text meeting predetermined criteria (in this example, a predetermined number of characters first appearing in the email body) are extracted as subject information, and as indicated in block 414, the extracted block of characters are displayed as the message subject in the subject field 86 for the message entry in the message list user interface 70. By way of example, with reference to FIG. 3, the email message 63 was originally received at the mobile device 10 from sender Pat Rae with a blank subject field, and with a message body that contained the text: "Dinner at 6PM at Restaurant Phillip—I'll make the reservation". The subject rendering module 302 is configured to extract up to the first 20 characters from the message body as subject information, and thus extracts "Dinner at 6PM at Re", which is displayed in subject column 86 as the subject information.

In at least some example embodiments, the extracted subject information is also cached or stored in a storage of the mobile device 10 (for example RAM 26 and/or flash memory 24) so that it can used when the message list user interface 70 is displayed in the future without requiring that the message body be accessed again. The stored subject information includes an identifier, pointer or other linking information associating it with the message that it was extracted from. Thus, once the subject information has been extracted and stored in respect of an email message, in the future when a list of messages including that message is displayed the stored subject information will be detected in step 404 and displayed in step 406. Additionally, in at least some embodiments, when the user selects a message for viewing, the stored subject information is inserted into the subject field of the displayed message. In mobile devices 10 in which content protection is enabled, the subject information that is stored is encrypted so that it can not be accessed unless the mobile device 10 is unlocked. In some embodiments, the stored subject information is accessible for subject searching by the messaging client 300 so that future keyword searches will locate the associated email messages. In some embodiments, rather than storing the extracted subject information in a unique subject information cache or database, the subject information may simply be inserted right into the copy of the email message stored on the device.

Although the process 400 has been described above as being initiated upon a request by a user causing the mobile device 10 to display the message list user interface 70, at least some of the steps of process 400 can be carried out at other times. For example, steps 408, 412 and 416 may be carried out in some embodiments when a new message is first received at the mobile device 10.

As noted above, messages arriving at the mobile device 10 can in an example embodiment be single encrypted (for example, encrypted only at the wireless connector system 124) or twice encrypted (for example, sender-encrypted messages that have been encrypted at the originating device and then encrypted again at the wireless connector system 124). Decryption of the encryption applied to the message at the wireless connector system 124 occurs after the message arrives at the mobile device 10 such that the user can view messages received as single encryption messages without entering any further passwords so long as the mobile device 10 is in an unlocked state (achieved through earlier entry of a password by the user). If content protection is enabled on the mobile device 10, messages received as single encrypted messages will be stored on the device in an encrypted state, but, at least in some configurations, can still be accessed without requiring a further password so long as the mobile device 10 is unlocked. In some cases, S/MIME messages will be signed by the sender, but not sender-encrypted, in which case the message will be single encrypted by the wireless connector system 124, and entry of an additional password at an unlocked mobile device 10 is not required to view the signed message.

However, as previously described, for sender-encrypted messages (whether signed or unsigned) that arrive at the mobile device 10 entry of an additional password (beyond a password to unlock the device) is required to view the received message. As here-to-fore described, the process 400 will extract text from an otherwise subject-less message to use as a subject provided that the message is not encrypted so as to require further user intervention (such as entry of a password) to decrypt and view the receive messages. So, by way of example, messages that are only encrypted at the wireless connector system 124 (including, among other things, messages that are signed but not encrypted at the device of the originating sender), will be subjected to the extraction step 412 of process 400. On the other hand, messages that require entry of a user password to actually open such messages (for example, sender-encrypted messages that require entry of a user password to decrypt and view the messages) will be excluded from the extraction step 412 of process 400 at step 408, as extracting unencrypted text would be of little assistance. (In some embodiments, the garbled text could of course be extracted and displayed, although it would be of little value other than to indicate that the message was likely encrypted). However, as will now be described, once the user of the mobile device 10 takes the step of entering the password necessary to decrypt and view the password-protected message (and in particular, enter the password necessary to retrieve the key needed to decrypt and view the encrypted message), then the opportunity exists to extract subject information for future use in the message listing user interface 70.

Figure 5:
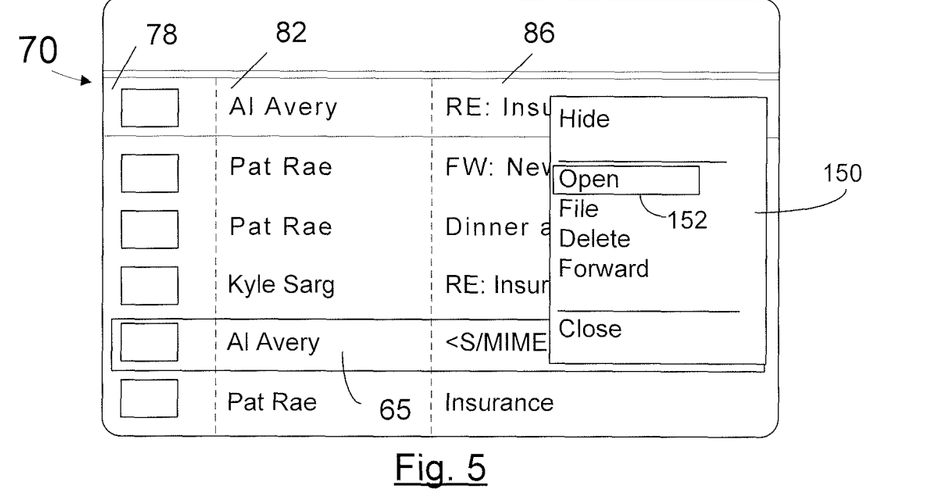
FIG. 5 shows, in diagrammatic form, the message list user interface of FIG. 3 with a further drop down menu.

FIG. 5 shows the message list user interface 70 once a user selects the sender-encrypted email message 65 from the list of displayed messages. As known in the art, an on-screen indicator is moved by the user using a keyboard or other user input device 32 (such as a thumbwheel or touch pad or touch screen) of the mobile device 10 to select the email message 65 and cause a dropdown menu 150 to be displayed. The menu 150 provides a number of selectable options for the selected email message, including a view or "open" option 152. User selection of the "open" option 152 results in a password entry request box 154 (FIG. 6) being displayed on the display screen 22 of the mobile device 10, in which the user must enter a predetermined password to proceed with opening the email message. In particular, entry of the correct password enables a decryption engine on the mobile device 10 to retrieve the device user's private key from the key store and use the device user's private key to decrypt the email message. As shown in FIG. 7, upon successful entry of the password, the email message 65 is decrypted and presented in a user interface screen 180 on the display screen 22 on the mobile device for viewing by the user. The email message 65 includes a message header portion that includes blank subject field 86, and a message body 184 that includes some text.

Figure 8:
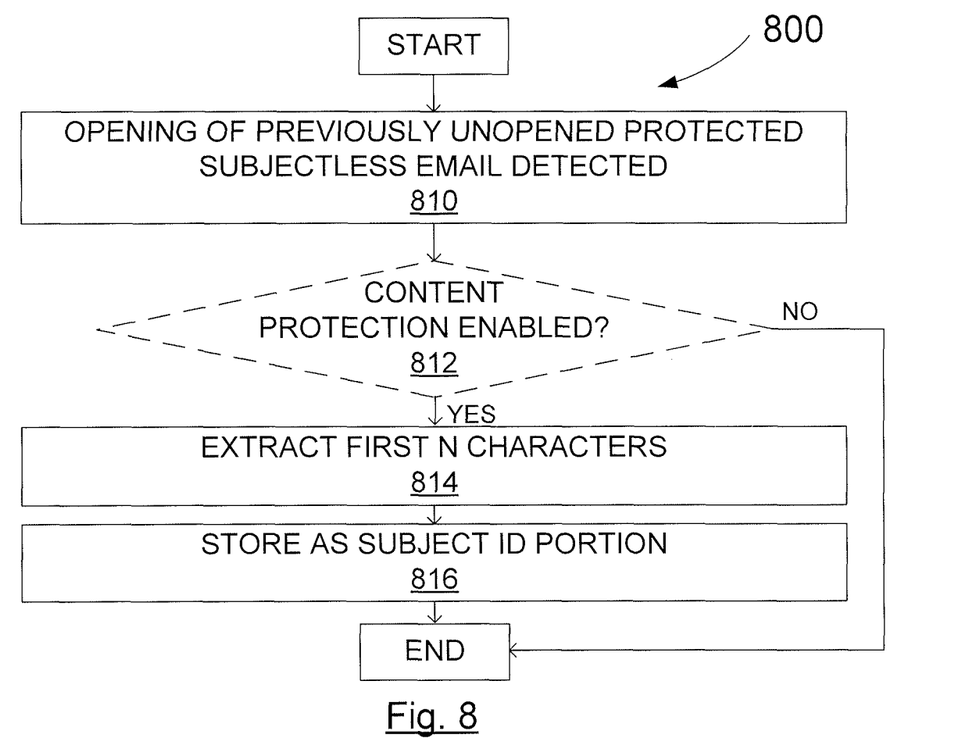
FIG. 8 shows, in flow chart form, part of a subject identification rendering method in accordance with example embodiments.

In an example embodiment of the invention, the messaging client 300 is configured to monitor for the first opening (and decryption) of a subject-less protected email message such as message 65 and then call on subject rendering module 302 to perform, with reference to FIG. 8, all or part of a subject rendering process 800 to generate subject information for the email message. As indicated in step 810, the process 800 begins with the detection of the opening/decryption of a previously unopened, protected subjectless email such as email message 65. As indicated in step 812, prior to proceeding further with the subject rendering process 800, a check is performed (step 812) to determine if content protection is enabled on the mobile device 10. As indicated above, when content protection is enabled, content stored on the device is locally encrypted and cannot be accessed when the device is in a locked state. As the subject information that is produced by the process 800 may include confidential information, step 812 is performed to ensure that any subject information that is generated will be saved on the device in an encrypted state. Thus, if content protection is not enabled, the process 800 is simply terminated, whereas if content protection is enabled, the subject rendering process is permitted to continue to extraction step 814. In some embodiments, step 812 may be omitted and the process 800 performed regardless of whether content protection is enabled or not. In some embodiments, the requirement for screening step 812 may be a configurable option that is set by an IT administrator.

Turning now to step 814, as the email message is decrypted upon successful password entry, the subject rendering module 302 is able to scan the email for unencrypted text to use as subject information. Extraction step 814 is carried out in a manner similar to extraction step 412 described above in respect of process 400 in that a block of text meeting predetermined criteria is copied from the message body 184 of message 65 to use as subject information. In the example shown, in FIG. 7, the text block of the first 20 characters includes "The proposed merger". Once the subject information is copied, as indicated in step 816 (and similar to above described step 416) the information is stored in a message subject information cache on the storage of the mobile device 10 (for example RAM 26 and/or flash memory 24) so that it can used when the message list user interface 70 is displayed in the future. As indicated above, assuming content protection is enabled, then the stored subject information will be stored in an encrypted state and not accessible when the device is in a locked state. In some embodiments, the copied subject information may immediately be displayed in the subject field 86 (see FIG. 7) of the displayed message user interface 180.

Figure 9:
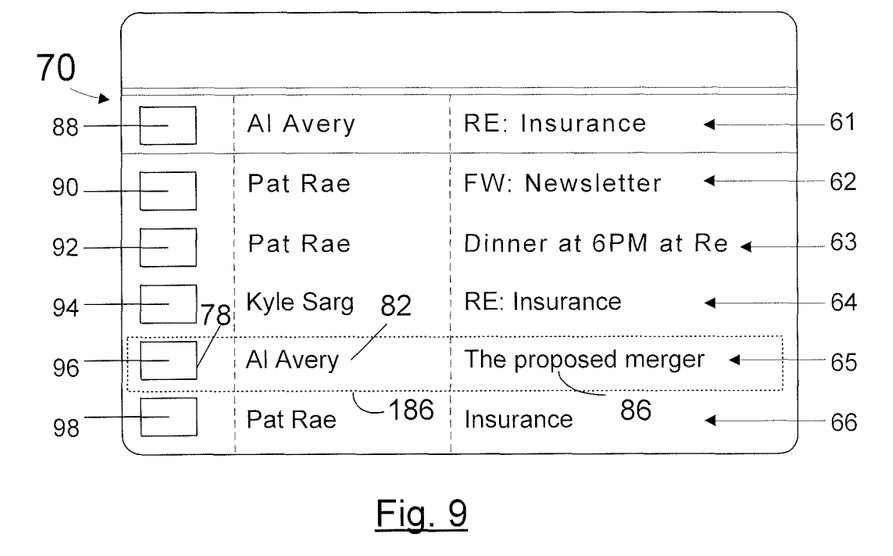
FIG. 9 shows, in diagrammatic form, a user interface screen similar to the one shown in FIG. 3, the screens of FIGS. 3 and 9 corresponding respectively to before and after the carrying out of a subject rendering method in respect of a protected email message.

At the completion of subject rendering process 800, stored subject information is available for the otherwise subject-less email 65, such that in the future when the message list user interface 70 is displayed on the display screen of the mobile device 22, the stored subject information can be used in the subject field 86. In particular, when the user takes a future action that results in the message list user interface screen being generated (such as, for example, closing the message being viewed in the interface screen 180, or opening the messaging client 300 form a home screen of the mobile device 10), the messaging client 300 will encounter the subject-less email message 65, which will trigger process 400 of FIG. 4. As indicated at step 404 a determination will be made that stored subject information exists in respect of the email message, and accordingly, as indicated at step 406, the stored subject information will be used in the subject field 86. By way of example, FIG. 9 shows the message list user interface 70 as generated after process 800 has stored subject information for the password-protected email message 65. The email message 65 is listed as an item 186 in the message list interface 70, with associated sender and subject fields 82, 86. The previously extracted and stored subject information "The proposed merger" is listed in the subject field 86 for the email message, for easy viewing by a user of the device 10.

The message list user interface 70 will in many cases be a scrollable display in which items scroll on and off the display screen as a user navigates through the list using a user input device of the mobile device 10, and in such configurations, the subject information scrolls on and off the screen adjacent the remaining information for its associated email message.

In some example embodiments, process 800 can be disabled by an IT administrator so as to avoid its unapproved use. For example, an IT Policy defined by the IT administrator can be sent to the device 10 that defines whether process 800 is enabled or disabled. Disabling process 800 may be desired where enhanced security is desired.

Figure 6:
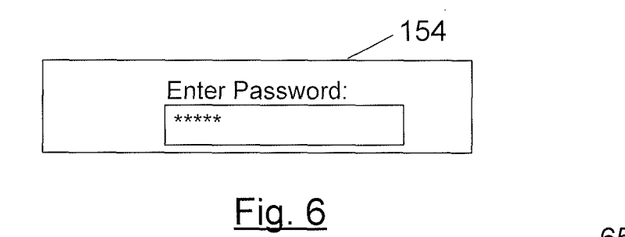
FIG. 6 shows an illustration of a password entry interface display.
Figure 7:
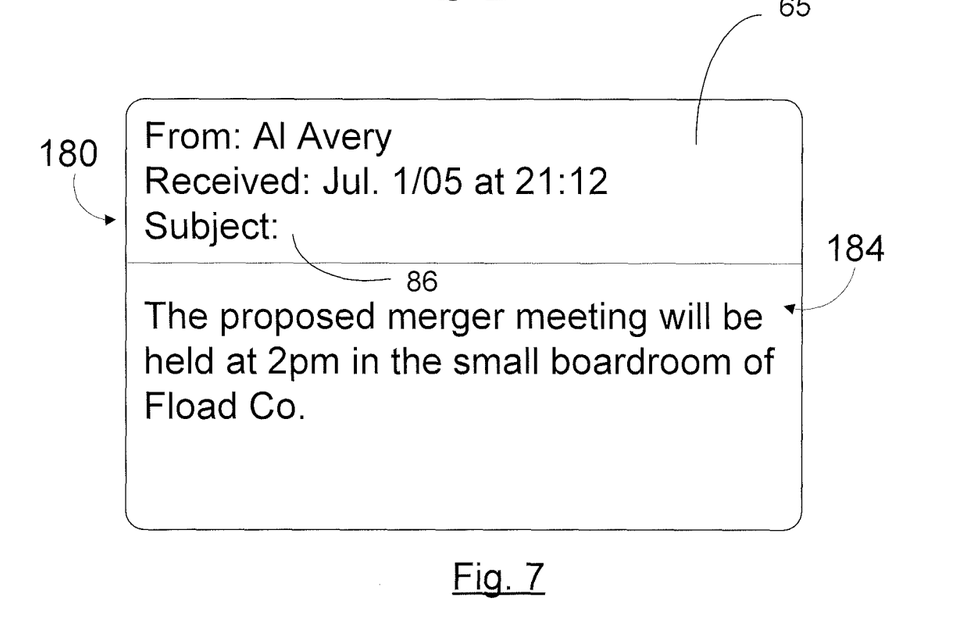
FIG. 7 shows, in diagrammatic form, a message viewing user interface generated on a display screen.

In alternative embodiments, other ways for a user to provide a shared secret to the mobile device 10 can be used instead of or in addition to the password entry box 154 of FIG. 6 in order to trigger decryption of a protected message or file. For example, the decryption authorizing user input may be in the form of a spoken password uttered by the user and picked up by a microphone of the device. A biometric input could be used as a component of the shared secret—including for example, a retinal scan through a retinal scanner, a fingerprint scan through a print scanner, voice pattern analysis through a microphone, and/or typing cadence patterns through the keyboard, among other things.

In extraction step 412 of FIG. 4 or extraction step 814 of FIG. 8, the subject information could be extracted according to a different or more complex algorithm than just simply extracting up to a first predetermined number of characters from the message body. For example, the subject rendering module 302 may be configured to skip over predetermined text phrases or character combinations at the start of the message body and then extract the next occurring characters up to a predetermined number of characters. Thus, common salutations such as "Dear"; "Hi"; "Hello", common titles such as "Mr."; "Ms."; "Dr.", etc. at the beginning of the message body, and common names such as "John", "Susan", "Smith", "Jones", could be skipped over. The list of predetermined phrases/character combinations to ignore can be user configurable. By way of example, in the case of the message 63 of FIG. 3, the message body may contain the text "Hello John, Dinner at 6PM at Restaurant Mario—I'll make the reservation", and the text "Hello John," will be ignored before extracting the 20 characters "Dinner at 6PM at Re" to use as the subject. Other extraction algorithms can also be applied—for example, up to N characters extracted, with all final characters not followed by a space being then being truncated, so as to avoid half a word in a displayed subject. So for example, referring to the email message 63 again, where the extraction limit were 20 characters, the result would be "Dinner at 6PM at Re" (with the word "Restaurant" cut off), and truncating all final characters not followed by a space would render the subject "Dinner at 6PM at". In some embodiments, the length of the extracted and stored subject information may exceed the available subject display field space on the user interface 70, in which case, only an initial part of the extracted and stored subject information may be displayed in the user interface 70.

In some embodiments, if the message body is empty, in extraction step 412 or 814, a check is done to determine if the message has an attachment that contains text, and if so, the subject information extraction step is carried out on the first text-containing attachment. In such embodiments, the attachments may be prioritized according to type, so for example a Word™ attachment will be given priority over a PDF attachment, for example, when selecting which of a plurality of attachments to extract subject information from.

In some embodiments, the S/MIME (or similarly sender-encrypted) message may be received at the mobile device 10 through a direct link, for example through a docking station, with the user's personal computer 110 within the enterprise network 108. In some embodiments, once a protected email has been initially opened using a password that triggers the decryption of the protected email, subsequent entry of the password is not require to open the message. In some embodiments, to conserve transmission bandwidth and on-device storage, an originating message may be broken up into smaller messages such that only part of the total originating message may actually be received and stored at a given time at the mobile device 10, with the user given the option to retrieve the remainder of the message parts as desired. When used herein in the context of messages received and/or stored at a communications device, the term "message" includes messages for which only part of the originating message has actually been received and stored at the device.

As indicated above, protocols such as S/MIME allow messages to be protected through signature alone, without encryption, at the originating sender's device, so that the sender's identity can be authenticated at the receiving device by accessing the sender's public key. In some example embodiments, the subject rendering module 302 will also generate a subject line for a received subject-less message that was protected at an originating sender's device using signature alone without encryption.

In one example embodiment, when a signed subject-less message is received at the mobile device 10, the message is received at the device 10 as a multi-part message, in which the message body is sent as an attachment to an email message (for example, an S/MIME compliant signed message can be multipart message, that an S/MIME client present on the device 10 is enabled to process). After a subject-less signed message is received at the device 10, the message attachment containing the text body is opened, and a predetermined number of characters from the text body are copied in the manner described above to use as subject information for the message in message list user interface 70. As a password is not required to open a signed-only message that has not been encrypted by the originating sender, the subject information can be extracted from a signed-only message any time after the message is received at the mobile device, including for example the following alternative possibilities: (a) as soon as a subject-less signed-only message is received at device 10, the subject rendering module 302 detects the arrival, and causes an S/MIME client on the device 10 to open the message attachment containing the message body such that the subject information can be copied from the message body and stored on the device 10 to be displayed in the subject field 86 whenever the message is displayed in the message list user interface 70 in the future; (b) after a subject-less signed-only message is received at the device, the message is stored until the device user causes the message list user interface 70 to be displayed for the first time after the subject-less message was received, at which time the subject rendering module 302 detects the presence of the subject-less message and causes an S/MIME client on the device 10 to open the message attachment containing the message body such that the subject information can be copied from the message body for display in the subject field 86 when the subject-less message is displayed in the message list user interface 70 (and in some cases stored for future use); or (c) after a subject-less signed-only message is received at the device, subject information for the message will only be extracted after a user first selects the message to be opened from the message list user interface 70—prior to that, the message is displayed in message list user interface 70 without a subject, as shown for message 65 in FIG. 3, for example.

In some embodiments, a signed message received at the mobile device 10 may be opaque-signed, meaning that even through the message has not been encrypted at originating sender's device, the message text is still not in a clear readable form, but rather the data needs to rearranged through a non-cryptographic operation performed by a S/MIME client (for example) so that understandable subject information can be extracted from the message body.

Certain adaptations and modifications of the described embodiments can be made. Therefore, the above discussed embodiments are considered to be illustrative and not restrictive.

What is claimed is:

1. A method for generating subject information in a message list for a protected message received and stored at an electronic communications device, wherein the protected message has been protected at an originating sender's device and is initially received by the electronic communications device without subject information, the method comprising:
   generating on a display screen of the electronic communications device the message list identifying messages that are stored on the electronic communications device and available to be viewed, the message list including a subject display field for subject information for each of a plurality of messages stored on the electronic communications device, the plurality of messages including at least one protected message, the generating including:
      for each protected message in the plurality of messages for which the subject display field is blank:
         determining if subject information for the protected message is stored on the electronic communications device;
         in response to determining that the subject information for the protected message is stored on the electronic communications device, including at least part of the stored subject information in the subject display field for the protected message; and
         in response to determining that the subject information for the protected message is not stored on the electronic communications device:
            extracting selected information from the protected message and including the selected information in the subject display field for the protected message, and storing the selected information on the electronic communications device as subject information for the protected message,
   wherein entry of a shared secret is required to open the protected message, the method comprising detecting that the protected message has been opened following successful entry of the shared secret and wherein the selected information is extracted from the protected message as a consequence to the protected message being successfully opened.

2. The method of claim 1 wherein the selected information is extracted from the protected message only the first time that the protected message is opened at the electronic communications device.

3. The method of claim 1 wherein the protected message has been encrypted at the originating sender's device, the method comprising decrypting the protected message after entry of the shared secret.

4. The method of claim 3 wherein the protected message that is received at the electronic communications device has been further encrypted at a location intermediate the originating sender's device and the electronic communications device, the method further comprising decrypting the received protected message at the electronic communications device to reverse the encryption applied at the intermediate location.

5. The method of claim 1 including prior to an opening of the protected message: displaying information about the protected message in a message list on the display screen of the electronic communications device and providing a prompt to provide the shared secret upon receiving an input indicating selection of the protected message from the message list for opening.

6. The method of claim 1 wherein the electronic communications device comprises a mobile device enabled to exchange messages over a wireless network, and wherein the generating of the message list is carried out in response to input to the electronic communications device and if no subject information is stored on the electronic communications device for the protected message when the message list is generated, then a predetermined phrase indicating that the protected message is protected is displayed in the subject display field for the protected message.

7. The method of claim 1 wherein the protected message received at the electronic communications device has been protected at the originating sender's device through encryption, an electronic signature, or through an encryption and electronic signature in compliance with either S/MIME or PGP/MIME.

8. The method of claim 1 wherein the protected message is an email message that is received at the electronic communications device without subject information, and includes a message body portion that contains text, and the selected information is at least partially selected from the text contained in the message body portion based on predetermined selection criteria.

9. The method of claim 8 wherein predetermined character combinations in the text are excluded from the selected information.

10. The method of claim 1 wherein extracting the selected information is performed once the protected message is received at the electronic communications device.

11. The method of claim 1 wherein extracting the selected information is performed after input to the electronic communications device requesting that a message list that includes subject information for a plurality of messages be generated.

12. The method of claim 1 wherein storing the selected information on the electronic communications device includes storing an identifier associating the selected information with the protected message from which the selected information was extracted.

13. The method of claim 1 wherein storing the selected information on the electronic communications device includes encrypting the selected information.

14. The method of claim 1 wherein the selected information is stored in a unique subject information cache or database.

15. An electronic communications device enabled to receive electronic messages, the electronic communications device including:
   a display screen;
   a communications subsystem for receiving messages from an external source;
   storage for storing messages received through the communications subsystem;
   an input device;
   a messaging client for processing messages received by the electronic communications device through the communications subsystem, the messaging client being configured for generating on the display screen a message list identifying messages that are stored on the storage and are available to be viewed, the message list including a subject display field for subject information for each of a plurality of messages stored on the storage, the plurality of messages including protected messages, the messaging client comprising a subject generating module being configured for, for each protected message for which the subject display field is blank: determining if subject information for the protected message is stored in the storage; in response to determining that the subject information for the protected message is stored on the storage, including at least part of the stored subject information in the subject display field for the protected message; and in response to determining that the subject information for the message is not stored on the storage:
      extracting selected information from the protected message and including the selected information in the subject display field for the protected message,
      and storing the selected information on the storage as subject information for the protected message,
   wherein at least some of the protected messages are sender encrypted and input of a shared secret is required to decrypt and open the sender encrypted protected messages, wherein the subject generating module is configured for extracting the selected information from a sender encrypted protected message only as a consequence to the sender encrypted protected message being successfully decrypted following input of the shared secret.

16. The electronic communications device of claim 15 wherein if no subject information is stored on the electronic communications device for a listed protected message when the message list is generated, the messaging client is configured to display in the subject display field for the listed protected message a predetermined phrase indicating that the listed protected message is protected.

17. The electronic communications device of claim 15 wherein the messaging client is configured for, prior to an opening of a listed protected message identified in the message list, providing a prompt to provide the shared secret upon receiving an input through the input device indicating selection of the listed protected message from the message list for opening.

18. The electronic communications device of claim 15 wherein protected messages consist of messages that have been encrypted, signed, or signed and encrypted, at an originating sender's device.

19. A non-transitory computer program product having a computer readable storage medium having stored thereon computer executable instructions for generating subject information in a message list for a protected message received and stored at an electronic communications device, wherein the protected message is initially received by the electronic communications device without subject information, the computer executable instructions including:
   instructions for generating on a display screen of the electronic communications device the message list identifying messages that are stored on the electronic communications device and available to be viewed, the message list including a subject display field for subject information for each of a plurality of messages stored on the electronic communications device, the plurality of messages including at least one protected message, the generating including:
      for each protected message in the plurality of messages for which the subject display field is blank:
         instructions for determining if subject information for the protected message is stored on the electronic communications device;
         in response to determining that the subject information for the protected message is stored on the electronic communications device, instructions for including at least part of the stored subject information in the subject display field for the protected message; and
         in response to determining that the subject information for the protected message is not stored on the electronic communications device:

instructions for extracting selected information from the protected message and including the selected information in the subject display field for the protected message, and instructions for storing the selected information on the electronic communications device as subject information for the protected message, wherein entry of a shared secret is required to open the protected message, the computer executable instructions comprising detecting that the protected message has been opened following successful entry of the shared secret and wherein the selected information is extracted from the protected message as a consequence to the protected message being successfully opened.

\* \* \* \* \*